(12) United States Patent
Ghoneim

(10) Patent No.: US 7,099,759 B2
(45) Date of Patent: Aug. 29, 2006

(54) METHOD AND APPARATUS FOR ESTIMATING STEERING BEHAVIOR FOR INTEGRATED CHASSIS CONTROL

(75) Inventor: Youssef A. Ghoneim, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 88 days.

(21) Appl. No.: 10/812,438

(22) Filed: Mar. 30, 2004

(65) Prior Publication Data

US 2005/0222731 A1 Oct. 6, 2005

(51) Int. Cl.
- B62D 6/00 (2006.01)
- B62D 101/00 (2006.01)
- B62D 111/00 (2006.01)

(52) U.S. Cl. .................... 701/41; 701/42; 701/70; 303/146

(58) Field of Classification Search .................. 701/41, 701/42, 37, 70, 48; 230/5.503, 5.51; 303/146; 180/443
See application file for complete search history.

(56) References Cited

U.S. PATENT DOCUMENTS

| 6,035,251 A | 3/2000 | Hac et al. |
|---|---|---|
| 6,125,319 A | 9/2000 | Hac et al. |
| 6,212,460 B1 | 4/2001 | Rizzo et al. |
| 6,325,469 B1 | 12/2001 | Carson et al. |
| 6,415,215 B1 * | 7/2002 | Nishizaki et al. ............. 701/70 |
| 6,453,226 B1 * | 9/2002 | Hac et al. ...................... 701/48 |
| 6,513,886 B1 | 2/2003 | Weber et al. |
| 6,547,343 B1 | 4/2003 | Hac |
| 6,615,124 B1 * | 9/2003 | Adachi ......................... 701/70 |
| 6,662,898 B1 * | 12/2003 | Mattson et al. ............. 180/446 |
| 6,842,683 B1 * | 1/2005 | Kim ............................ 701/70 |
| 6,895,318 B1 * | 5/2005 | Barton et al. ................. 701/42 |
| 6,909,957 B1 * | 6/2005 | Suissa ......................... 701/82 |

FOREIGN PATENT DOCUMENTS

| JP | 04-081316 | * | 3/1992 |
|---|---|---|---|
| JP | 20003-252084 | * | 9/2003 |

* cited by examiner

*Primary Examiner*—Michael J. Zanelli
(74) *Attorney, Agent, or Firm*—Kathryn A. Marra

(57) ABSTRACT

A method and apparatus for providing integrated chassis control of a vehicle over the entire range of the vehicle dynamic state, including steady state and non-steady state steering conditions and linear and non-linear tire behavior, based on the general steer equation by using an estimated understeer and oversteer steering behavior indicator. The method and apparatus are particularly adapted to provide a yaw control apparatus and method. The steering behavior indicator may be calculated as a function of certain vehicle dynamic state inputs. A weighting factor for the calculation of the steering behavior indicator is determined as a function of certain vehicle dynamic state indication parameters.

31 Claims, 6 Drawing Sheets

METHOD AND APPARATUS FOR ESTIMATING STEERING BEHAVIOR FOR INTEGRATED CHASSIS CONTROL

TECHNICAL FIELD

This invention relates generally to an apparatus and method for providing integrated chassis control. More particularly, the invention is a method and apparatus for estimation of a steering behavior indicator for a vehicle in the dynamic state and providing integrated chassis control based on the estimated steering behavior indicator.

BACKGROUND OF THE INVENTION

Integrated chassis control generally comprises the integration or coordination of the operation of one or more vehicle controls, including control components, subsystems or systems, to improve vehicle dynamic performance and responsiveness. Integrated chassis control is used to improve overall vehicle dynamic performance by providing stability and handling predictability to a vehicle to support a broad spectrum of anticipated vehicle operators having a wide range of operating styles over a broad range of vehicle operating environments, including a wide range of vehicle dynamic states comprising accelerating, braking and coasting, combined with various types of steering inputs and maneuvers, tire characteristics and loading conditions, vehicle loading conditions, vehicle settings and other variables associated with the vehicle dynamic condition, and also including a wide range of roadway types, conditions and other variables associated with the operating environment. Integrated chassis control comprises controlling the dynamic response of a vehicle with respect to one or more of the degrees of freedom associated with vehicle movement in the operating environments mentioned by integrating or coordinating the operation of the basic vehicle controls, including steering, braking, engine, transmission and suspension controls, as well as other more advance vehicle controls, such as vehicle stability enhancement (VSE) systems, yaw control systems, traction control systems, antilock braking systems (ABS), throttle control systems, variable assist steering systems, variable ratio steering systems, active front steering (AFS) systems, variable suspension systems, and variable ratio steering systems. These vehicle controls are frequently computer-controlled using microcontrollers and a various electronic and electromechanical sensors, transducers, actuators and other components. An integrated chassis control system typically comprises one or more electronic controllers or control modules to implement a method or control algorithm for integrating or coordinating the vehicle controls and thereby improve vehicle dynamic stability and performance.

Because steering is one of the principal elements of vehicle control, the overall operating stability and dynamic performance of the vehicle is particularly characterized by its steering performance. In a given operating environment, steering stability and performance of a vehicle is in large measure characterized by its understeer and oversteer behavior. For a vehicle exhibiting oversteer, in a steady state condition, the steering angle required to negotiate a path of fixed radius decreases with increasing forward speed. For a vehicle exhibiting understeer, in a steady state condition, the steering angle required to negotiate a path of fixed radius increases with increasing forward speed. The steady state steering or cornering condition refers to a dynamic state or condition of the vehicle wherein the vehicle dynamic response(s) or output within the permitted degrees of freedom, such as the yawing velocity, lateral velocity, forward velocity, and rolling velocity, to periodic or constant inputs of the vehicle controls, such as the steering system, does not change significantly as a function of time for a given time interval. Transient state steering or cornering conditions include all dynamic states or conditions other than steady state conditions, such as, for example, where the steering control inputs are not periodic or are changing, or where the vehicle response(s), such as the yawing velocity, lateral velocity, forward velocity, and rolling velocity are changing.

A steering coefficient, $K_\mu$, or indicator of the understeer or oversteer behavior can be can be calculated under steady state conditions for a vehicle from the following general steer equation:

$$\delta_f = \frac{L\dot{\psi}}{V_x} + K_\mu a_y \qquad (1)$$

where $\delta_f$, L, $\dot{\psi}$, $V_x$, $a_y$ are the steering angle, wheel base, yaw rate, speed and lateral acceleration of the vehicle, respectively. This equation is based on a two degree of freedom bicycle model of a front wheel steer vehicle. The understeer calculation in this case encompasses the understeer gradient arising from the nominal cornering stiffness of the tire and the effect of the load transfer.

The above equation is valid in the linear range of the tire behavior, when the lateral force generated by the tire is proportional to the tire slip angle, during steady state conditions. Under non-linear tire behavior or during transient state conditions, the general steer equation becomes indeterminate and an oversteer and understeer behavior indicator cannot be determined using this mathematical expression.

Therefore, it is very desirable to develop a method and apparatus which may be used to characterize the steering behavior of a vehicle under non-linear, transient conditions and which is adapted for use in an integrated chassis control system.

SUMMARY OF THE INVENTION

The present invention comprises a method and apparatus for extending the use of the general steer equation to determine an estimated understeer and oversteer behavior indicator for a vehicle under all vehicle dynamic states and operating environments, including linear and non linear tire behavior and steady state and transient state operation of the vehicle.

The method of the invention comprises providing a plurality of dynamic state inputs which are indicative of a dynamic state of the vehicle to a controller that is adapted to execute a plurality of control loops utilizing the dynamic state inputs. The dynamic state inputs are provided to the controller and used to calculate an estimated steering behavior indicator during each of the plurality of control loops. As the dynamic state of the vehicle changes, the value of the estimated steering behavior indicator also changes, thereby providing an indication of the steering behavior of the vehicle in the dynamic state. Information related to the dynamic state inputs and the calculation of the estimated steering behavior indicator is stored for a portion of the plurality of control loops and used in the calculation of the steering behavior indicator. The vehicle is controlled using the controller in response to the value of the estimated steering behavior indicator.

The estimated steering behavior indicator for a control loop is calculated by updating an estimated steering behavior indicator of a prior control loop using a dynamic state correction term which has a value that is a function of the dynamic state of the vehicle. The dynamic state correction term preferably comprises an estimation error related to the calculation of the estimated steering behavior indicator for the control loop. The estimation error is also preferably factored by an estimation error correction factor that is adapted to correct the estimation error as a function of the vehicle dynamic state. The estimation error correction factor is a function of a weighting factor that varies as a function of the vehicle dynamic state.

The value of the weighting factor for a control loop is determined by comparing the actual values of certain dynamic state indication parameters of the vehicle associated with the control loop with threshold values of these parameters using a series of conditional logic tests. In this way, the value of the weighting factor, and consequently the estimated steering behavior indicator, changes as function of the dynamic state of the vehicle.

The integrated chassis control system includes a controller, which is adapted to receive a plurality of dynamic state inputs that are indicative of a dynamic state of a vehicle during its operation and determine a steering behavior indicator from the dynamic state inputs that is indicative of a dynamic state of the vehicle in conjunction with a plurality of control loops, and a control system that is adapted to communicate with the controller and provide control of the dynamic state of the vehicle in response to the steering behavior indicator. The preferred dynamic state inputs of the vehicle include a speed input, a yaw rate input, a steering angle input and a lateral acceleration input.

The apparatus and method of the present invention may preferably be utilized as an apparatus and method for providing yaw control of a vehicle. The apparatus and method of the present invention have a particular advantage over previous integrated chassis control systems and methods, particularly systems and methods which provide yaw control, because it provides an estimate of the steering behavior indicator that enables real time control based on the use of the general steer equation over the entire range of the vehicle dynamic state, including non-linear tire behavior and non-steady state or transient steering conditions, and also enables compensation or adjustment of control models that utilize the indicator to changes which may occur to the vehicle or its operating environment, such as changes caused by the normal wear of certain vehicle components that affect the vehicle dynamic response. For example, the present invention enables the real time adjustment of the steering behavior indicator to changes in the roadway, operating environment, vehicle loading, mechanical condition and other factors which determine the dynamic state of the vehicle. Previous vehicle control systems and methods have typically been based on the use of a preselected value, or series of values, for the steering behavior indicator which were selected to approximate the entire expected range of the vehicle dynamic state, and which were not adapted to change in response to changes in the vehicle dynamic state, roadway, operating environment, vehicle loading, mechanical condition and other factors.

BRIEF DESCRIPTION OF THE DRAWINGS

The present invention will be more fully understood from the accompanying drawings, in which.

DESCRIPTION OF THE PREFERRED EMBODIMENT

Figure 1:
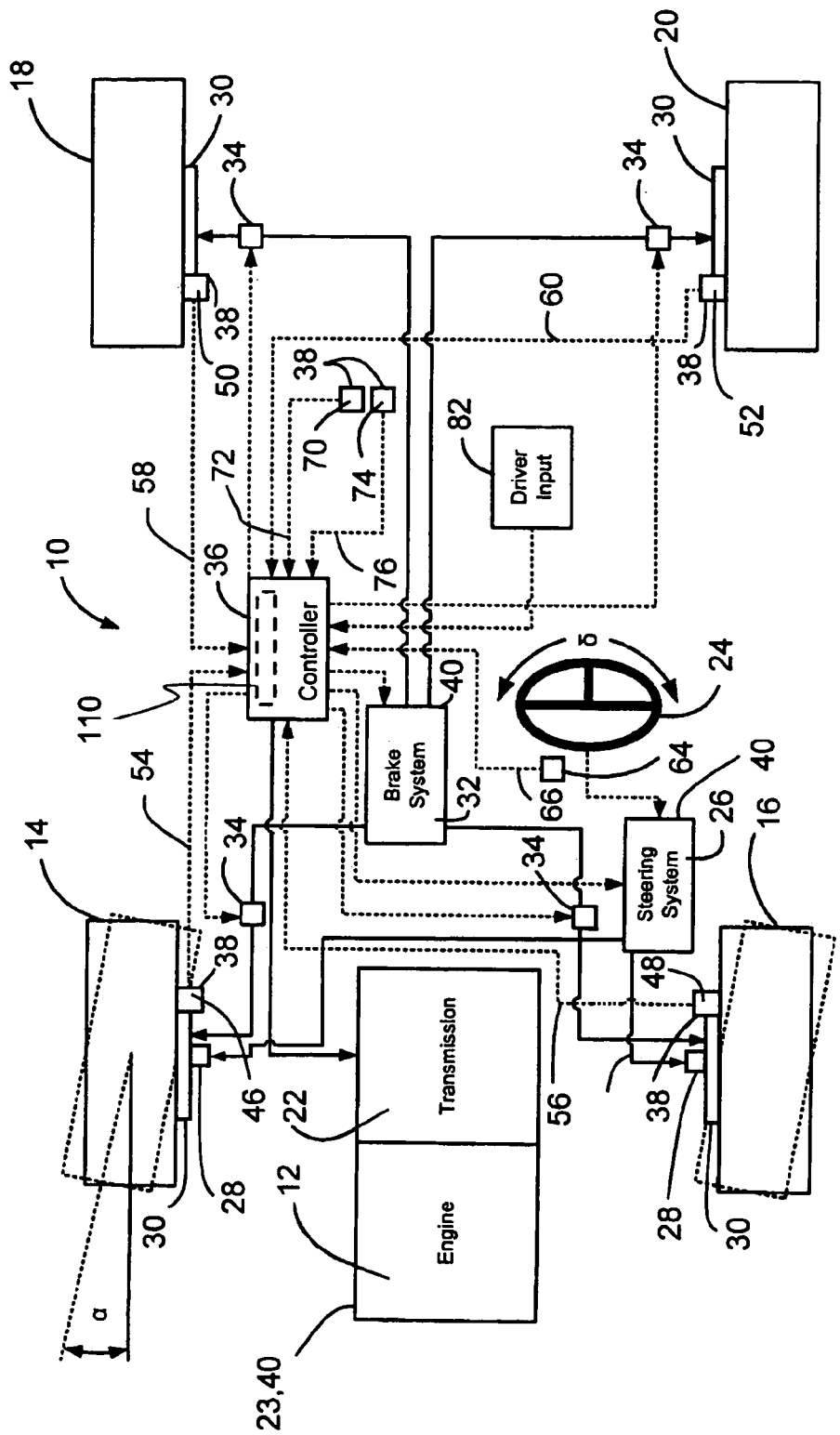
FIG. 1 is a schematic illustration of a vehicle comprising an apparatus of the present invention.

Referring to FIG. 1, the apparatus and method of the present invention are adapted for use in vehicle 10. Vehicle 10 includes engine 12 that is adapted to produce a driving torque that is transferred to front road wheels 14,16, or rear road wheels 18,20 or all of them, respectively, through transmission 22 for propulsion of vehicle 10. Engine 12 and transmission 22 comprise propulsion system 23. Vehicle 10 also includes steering wheel 24 and steering system 26, such as for example a rack and pinion steering system, comprising steering actuators 28, such as for example a rack and pinion gear and associated linkages, that is adapted to steer front road wheels 14,16 to a desired steering angle ($\angle \alpha$). Vehicle 10 also includes brakes 30 located at each of road wheels 14,16,18,20 and braking system 32, such as for example a hydraulic braking system, comprising brake actuators 34 that are adapted to actuate brakes 30. Vehicle 10 may comprise any suitable vehicle, including an automotive vehicle, and is not limited to conventional automotive designs comprising an internal combustion engine 12, transmission 22, and mechanically linked steering system. Vehicle 10 may also comprise a hybrid electric vehicle or fuel cell vehicle, which may supplement or replace an internal combustion engine and/or transmission with an electric drive motor. Vehicle may also comprise "by-wire" steering systems, braking systems, throttle systems or other vehicle control systems, which are not mechanically coupled to an operator input device, such as a steering wheel, brake pedal, throttle or cruise control.

Figure 2:
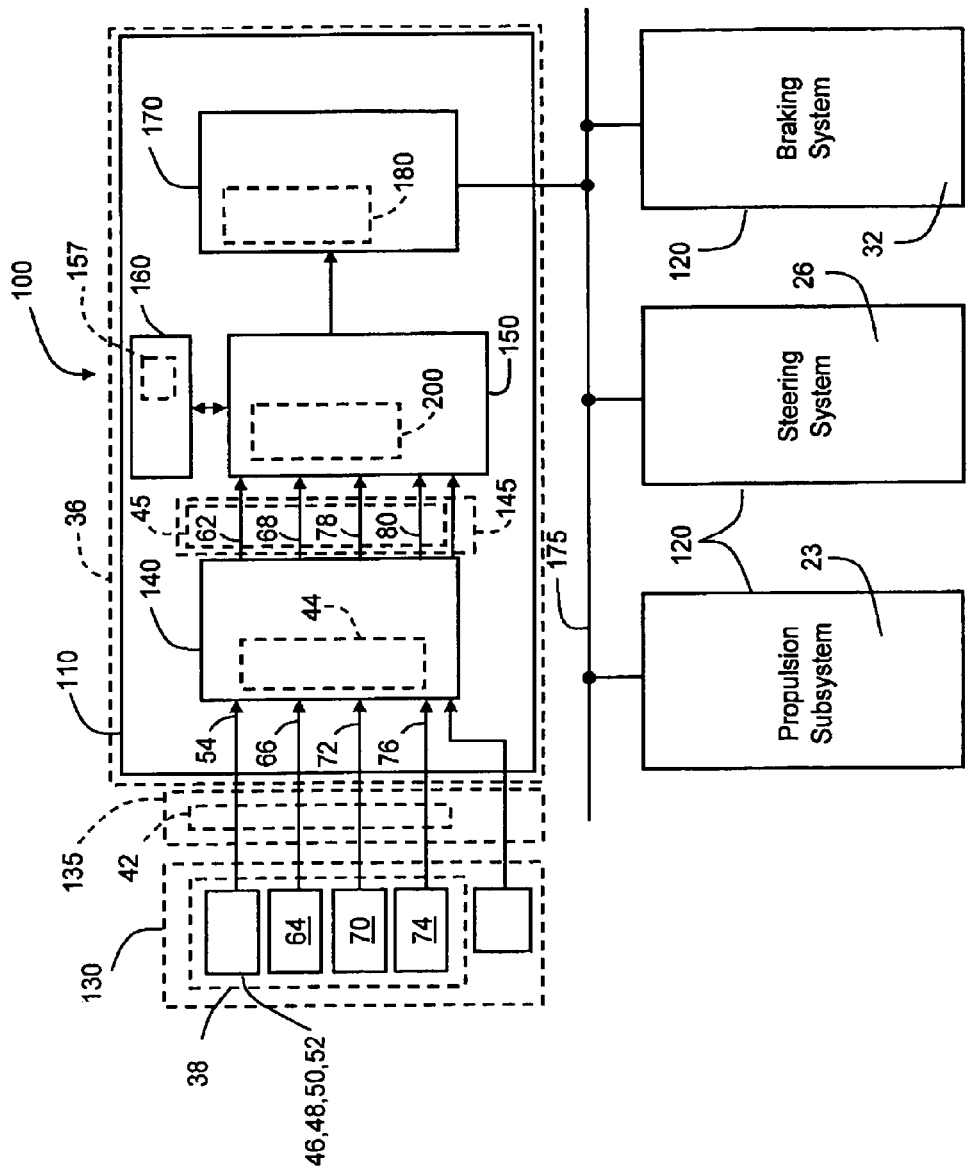
FIG. 2 is a schematic illustration of an apparatus of the present invention.

Referring to FIGS. 1 and 2, vehicle 10 includes a vehicle or system controller 36 that monitors and controls vehicle operation based on the integrated control of the present invention. Controller 36 is a conventional microprocessor-based controller comprising such common elements as one or more microprocessors, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning, signal processing and buffer circuitry. Controller 36 functions to acquire data from a plurality of sensors 38 and provide control of vehicle 10 through one or more control systems 40. Controller 36 is in signal communication with sensors 38 that are adapted to sense a plurality of dynamic state parameters of vehicle 10, such as wheel speed, yaw rate, lateral acceleration, and steering angle, and produce a corresponding plurality of sensor signals 42 that are representative of the value of the sensed dynamic state parameters. Sensor signals 42 may be conditioned and processed by an appropriate signal processing apparatus 44 using known signal processing methods. This signal processing may be performed using any appropriate signal processing apparatus 44 and method, or a plurality of apparatuses and methods associated with sensor signals 42, and may also be incorporated into a signal processing portion of controller 36. As used herein, signal processing broadly refers to the conversion of sensor signals 42 to dynamic state inputs 45 that may be used in accordance with the method of the invention described herein.

Referring to FIG. 1, as vehicle 10 is operated wheel speed sensors 46, 48, 50, 52 generate wheel speed signals 54,56, 58,60, respectively, which are communicated to controller 36. For a given vehicle 10, wheel speed signals 54,56,58,60 may be processed and used and to determine vehicle speed and a vehicle speed input 62 for use in controller 36 by known methods. A vehicle speed input may also be determined by using a speed sensor (not shown) to sense the rotational speed of the output shaft of the transmission using known speed sensors and signal processing methods. Steering angle sensor 64 generates a steering angle signal 66 that is communicated to controller 36. As described above, controller 36 may be used to process steering angle signal 66 and determine steering angle input 68. A yaw rate sensor 70 generates a yaw rate signal 72 and a lateral accelerometer 74 generates a lateral acceleration signal 76, which signals are communicated to controller 36 and may be appropriately processed to provide yaw rate input 78 and lateral acceleration input 80, respectively. Vehicle speed input 62, steering angle input 68, yaw rate input 78 and lateral acceleration input 80 comprise dynamic state inputs 45.

Referring again to FIG. 1, vehicle 10 is adapted for control by an operator (not shown) such that the vehicle operator manipulates an operator input 82 that is in signal communication with and operatively coupled to controller 36. Operator input 82 may include one or more of any of a number of known operator inputs, and preferably comprises a throttle input, cruise control input, or brake input (not separately shown) or steering input using steering wheel 24. In the case of a throttle or cruise control, operator input 82 typically generates a propulsion command, such as an engine speed and/or torque command, and controller 36 controls or supervises the control of the engine 12, transmission 22 or both in response to the propulsion command. In the case of a brake pedal, operator input 82 generates a brake command and controller 36 operates or supervises the operation of braking system 32 and brakes 30 to control braking of the road wheels based on the brake command. In the case of steering wheel 24, operator input 82 generates a steering command and controller 36 operates or supervises the operation of steering system 26 and steering actuators 28 to control steering of the road wheels based on the steering command.

FIG. 2 schematically illustrates an integrated chassis control system 100 of the present invention for use in vehicle 10. Control system 100 generally comprises a controller 110 to monitor and control the operation of at least one control system 120 in accordance with method 200 described herein. As illustrated in FIG. 2, controller 110 may comprise or be incorporated as an integral portion of vehicle controller 36, or may alternately constitute a separate controller that is in operative communication with vehicle controller 36. Controller 110 may comprise a single controller or a plurality of controllers which are distributed within vehicle 10, including within control systems 120. Controller 110 is preferably a closed-loop controller and is adapted to execute a plurality of control loops during the operation of vehicle. Controller 110 is in signal communication with a plurality of sensors 130, such as those comprising sensors 38, that are adapted to sense a plurality of dynamic state parameters of vehicle 10, such as wheel speed, yaw rate, lateral acceleration, and steering angle, and produce a corresponding plurality of sensor signals 135, such as those comprising sensor signals 42, that are representative of the value of the sensed dynamic state parameters. The sensor signals 135 may be processed by an appropriate signal processing apparatus 140, such as signal processing apparatus 44, which may comprise a signal processing portion 140 of controller 110. Signal processing portion 140 of controller 110 provides dynamic state inputs 145 to an input processing portion 150 of controller 110 that is adapted to use dynamic state inputs 145 in conjunction with the calculation of steering behavior indicator 155 during control loops in accordance with the method 200 described herein. Dynamic state inputs 145 preferably comprise vehicle speed input 62, steering angle input 68, yaw rate input 78 and lateral acceleration input 80. It will be recognized however, that the nature of the method of calculating the estimated steering behavior indicator and the associated quantities, relationships and mathematical operations involved permits substitution of equivalent expressions and other permissible alterations of the method, including the utilization of other dynamic state inputs, without deviation from the scope of the present invention. Steering behavior indicator 155 is indicative of the dynamic state of vehicle 10, and particularly whether vehicle 10 is in an oversteer or an understeer condition. The dynamic or vehicle state of vehicle 10 refers to the state of the dynamic forces associated with the motion of vehicle 10 as it is operated within its permissible degrees of freedom in a given operating environment. A positive value of the steering indicator indicates an understeer condition while a negative value indicates an oversteer condition. For normal vehicle use, an understeer condition is generally considered to be a more preferred condition and an oversteer condition is generally considered to be less preferred. Steering behavior indicator 155 is preferably an estimated steering behavior indicator determined from dynamic state inputs 145 in accordance with the method 200 described herein. Controller 110 is also adapted to store control algorithm 157, or plurality of control algorithms, which may be used to determine steering behavior indicator 155 in accordance with method 200 described herein, as well as store any information, including calculated values, dynamic state inputs or other parameters, for a given control loop or preceding control loops, necessary for the determination of steering behavior indicator 155. This information may be stored in information storage portion 160 of controller 110. Information storage portion 160 of controller 110 is in signal communication with input processing portion 150 to provide the information necessary for the calculation of steering behavior indicator 155. Once steering behavior indicator 155 been calculated, it may be used to control the dynamic state of vehicle 10. Estimated steering behavior indicator 155 is then used by controller 110 to affect control over control system 120. This control is preferably performed by a control output portion 170 of controller 110 that is adapted to provide control command outputs from controller 110 to control systems 120. Control output portion 170 of controller is in signal communication with control system 120. Such signal communication may comprise any suitable means or method of communication, but is preferably a data bus 175 that is adapted to provide bidirectional communication between controller 110 and control system 120.

Figure 3:
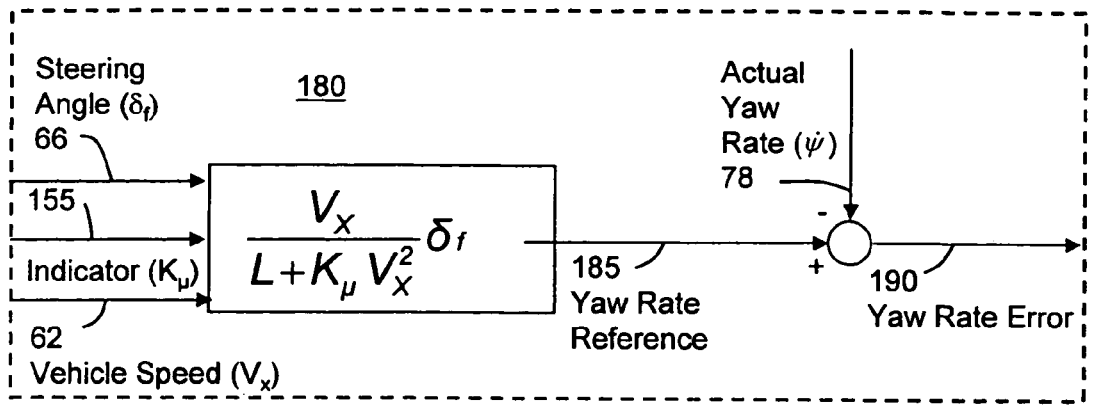
FIG. 3 is a schematic illustration of a yaw control of the present invention.

Referring again to FIG. 2, control system 120 is adapted to communicate with controller 110 and provide control of the dynamic state of vehicle 10 in response to estimated steering behavior indicator 155. The control of the dynamic state of vehicle 10 provided by control system 120 may be any control of the dynamic state that may be obtained using steering behavior indicator 155, but is preferably yaw control. Referring to FIG. 3, a control for vehicle 10 comprises a yaw control system 180 that may comprise a yaw control portion of controller 110 or a separate control that is adapted to communicate with controller 110 and provide control of the dynamic state of vehicle 10, in this case the yaw rate, in response to the steering behavior indicator 155. Yaw control system 180 utilizes vehicle speed input 62, steering angle input 68 and steering behavior indicator 155 in conjunction with the general steering equation to determine a yaw rate reference 185. The difference between yaw rate reference 185 and the actual yaw rate 78 constitutes a yaw rate error 190. Yaw control of vehicle 10 is performed by using control systems 120 to affect control of the vehicle dynamic state and dynamic state parameters to minimize yaw rate error 190. This general type of yaw control based on a yaw rate error is conventional, however, conventional yaw controls based on yaw rate error utilize a fixed value or plurality of values for the steering behavior indicator that are generally associated with vehicle 10 in conjunction with its manufacture. This is also the case for other conventional vehicle controls, such as various VSE systems, that make use of steering behavior indicator, $K_\mu$, and the general steering equation, because it has not previously been possible to determine a real—time value for the steering behavior indicator. The present invention is particularly advantageous in that it permits the accurate calculation of steering behavior indicator 155 in real-time, hence, the value of steering behavior indicator 155 is constantly adjusted for changes in the dynamic state, including changes related to changes in the vehicle and components thereof, changes in the dynamic forces on the vehicle associated with vehicle motion and changes in the operating environment. It is believed that the present invention will enable more accurate control of vehicles which utilize controls that are based on the general steering equation and steering behavior indicator, including numerous adaptations and variations thereof.

Yaw control 180 is adapted to use steering behavior indicator 155, which is preferably updated and recalculated continuously as vehicle 10 is operated. Yaw control of vehicle 10 may be affected by changing the vehicle speed, steering angle or value of the steering behavior indicator, or combinations thereof. This control may be provided by a single control system 120 or a plurality of control systems 120. For example, changes in the vehicle speed may be affected by braking system 32 or propulsion subsystem 23, either by operator input in response to an input request from controller, or preferably automatically by adapting braking system 32, propulsion system 23, or both of them, to make changes in response to a command initiated by controller 110. Steering angle changes may be affected using steering system 26, either by an operator input in response to an input request from controller, or preferably automatically by adapting steering system 26 to make steering angle changes in response to a steering command initiated using controller 110. Control system 120 preferably comprises at least one control system selected from the group consisting of propulsion control system 23, braking control system 32, steering control system 26 and a suspension control system (not shown) that is adapted to automatically control the compliance of the vehicle suspension and forces exerted on the road wheels.

Control of the dynamic state may also be performed by coordinating control of a plurality of these or other control systems 120. Other control systems 120 that are adapted to control vehicle 10 in response to steering behavior indicator 155 in accordance with the present invention may comprise various VSE systems, traction control systems, ABS systems, throttle control systems, variable assist steering systems, variable ratio steering systems, AFS systems and variable suspension systems. Such control will preferably be implemented using a control system 120, or a plurality of control systems 120, through which closed loop control can be affected to change the value of the dynamic state inputs and the value of the estimated steering behavior indicator, during subsequent control loops. Control systems 120 are preferably adapted to receive and execute control commands that are either supplemental to or independent of the control commands provided by an operator.

Referring to FIGS. 1–7, the present invention also comprises method 200 of controlling a vehicle 10. Method 200 generally comprises the steps of: sensing 210 a plurality of dynamic state parameters related to the dynamic state of vehicle 10; providing 220 a plurality of dynamic state inputs to controller 110 in vehicle 10 that is adapted to execute a plurality of control loops (k), each dynamic state input 135 indicative of a dynamic state of the vehicle; calculating 230 an estimated steering behavior indicator ($\hat{K}_\mu(k)$) 155 using controller 110 and dynamic state inputs 140 during each of the plurality of control loops (k) such that estimated steering behavior indicator 155 is adapted to provide an indication of the steering behavior of the vehicle during the dynamic state; storing 240 information related to dynamic state inputs and the step of calculating 230 the estimated steering behavior indicator for a portion of the plurality of control loops; and controlling 250 the vehicle in response to estimated steering behavior indicator 155.

Figure 4:
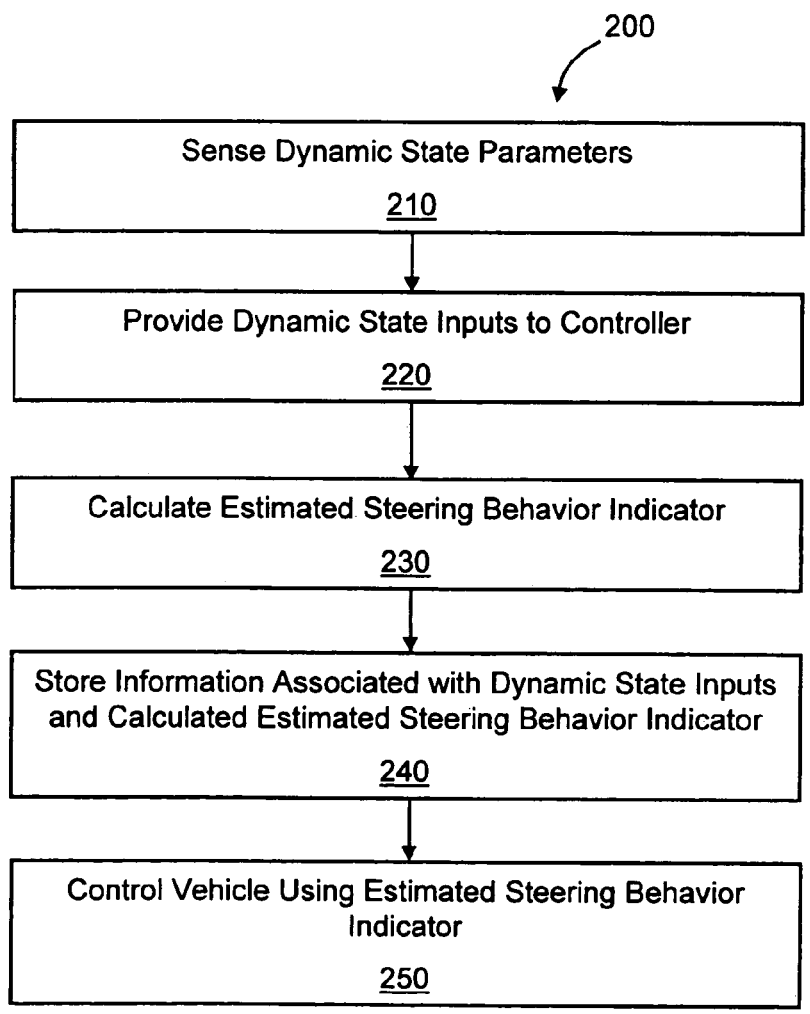
FIG. 4 is a schematic illustration of the steps of the method of the present invention.

Referring to FIG. 4, the step of sensing 210 a plurality of dynamic state parameters may be performed using any sensor, or combination of sensors, that is adapted to sense all of the desired dynamic state parameters. The specific plurality of dynamic state parameters to be sensed will depend upon the detailed embodiment of the step of calculating 230 and the specific nature of the desired dynamic state inputs 140 used for this step. For example, in the embodiment described herein, the preferred sensors are wheel speed sensors 46,48,50,52, steering angle sensor 64, yaw rate sensor 70 and lateral acceleration sensor 74 to sense and generate wheel speed signals 54,56,58,60, steering angle signal 64, yaw rate signal 72 and lateral acceleration signal 76, respectively, as described herein. Also, the step of sensing 210 should be construed broadly to also include the estimation or calculation of a desired dynamic state parameter either directly or indirectly from another sensed parameter, or combination of parameters, or by the employment of other means or methods.

Referring to FIGS. 1–7, method 200 also comprises the step of providing 220 a plurality of dynamic state inputs 145 to controller 110 in vehicle 10. Dynamic state inputs 145 may be obtained from the sensor signals 135 associated with the sensed dynamic state parameters. These sensor signals will preferably receive appropriate signal processing to obtain dynamic state inputs 145 related to the sensed dynamic state parameters associated with a particular control loop 130. Signal processing may, for example, be performed within controller 36, or within a separate control module or controller associated with the related signal, that is adapted to perform the signal processing that is desired to obtain the desired dynamic state input 145. For example, in the case of vehicle 10, having wheel speed signals 54,56, 58,60, steering angle signal 66, yaw rate signal 72 and lateral acceleration signal 76, the dynamic state inputs obtained for use in accordance with the method of the invention comprise vehicle speed input 62, steering angle input 68, yaw rate input 78 and lateral acceleration input 80, which are indicative or representative of the dynamic state of vehicle 10 in accordance with method 200 described herein.

Figure 5:
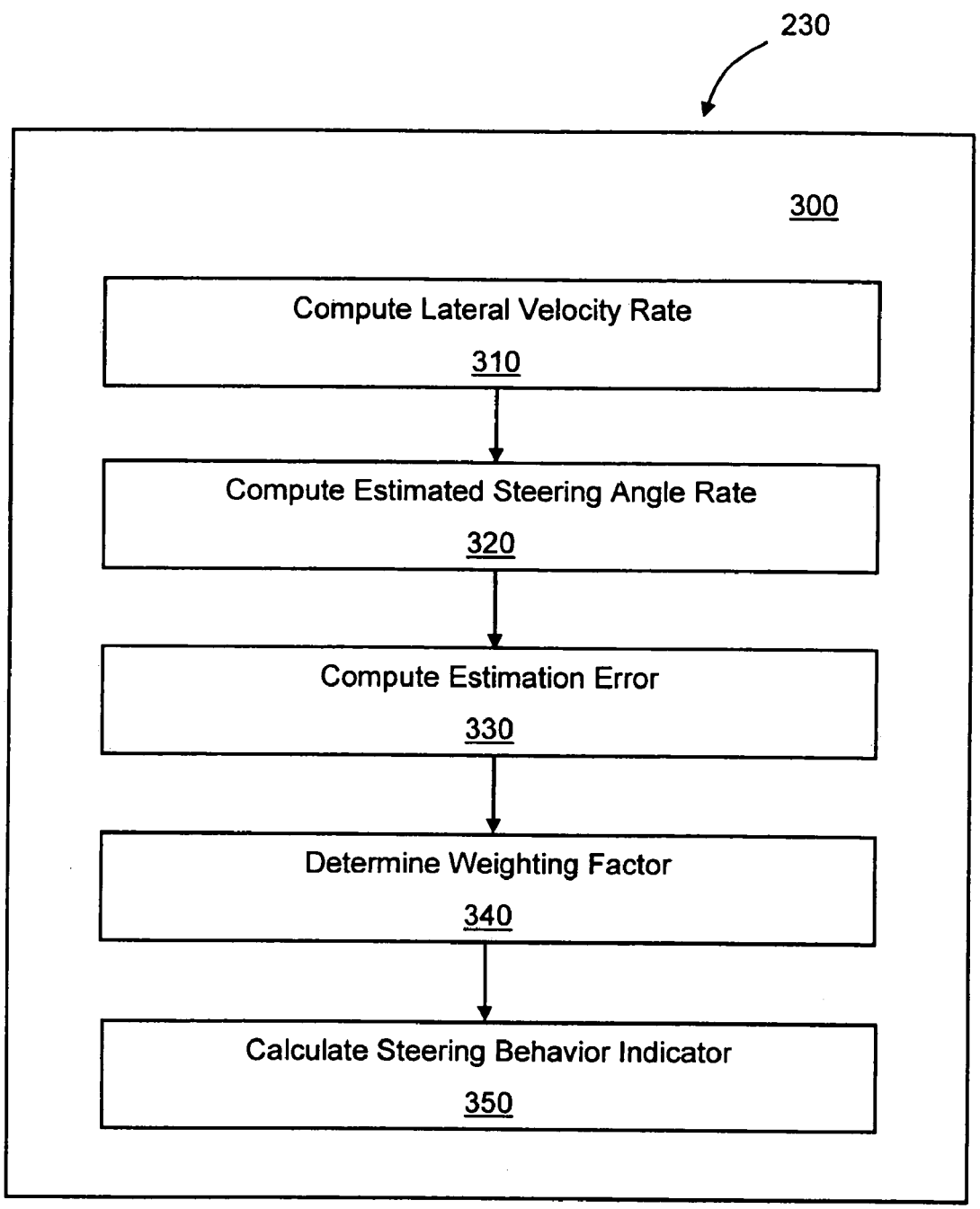
FIG. 5 is a schematic illustration of the step of calculating the estimated steering behavior indicator.

Referring to FIGS. 4 and 5, once dynamic state inputs 145 have been determined for a particular control loop (k), method 200 incorporates the step of calculating 230 the estimated steering behavior indicator ($\hat{K}_\mu(k)$) 155. The calculation represents an adaptation of the general steering equation to determine an estimate of steering behavior indicator 155 for vehicle understeer or oversteer over a broad range of the dynamic state of the vehicle, including both steady state and transient steering or cornering conditions and linear and non-linear tire behavior. Estimated steering behavior indicator 155 is calculated using controller 110 and dynamic state inputs 140 during each of the plurality of control loops (k) by executing computer control algorithm 157. Computer control algorithm 157 is adapted to calculate a value for estimated steering behavior indicator 155 which provides an accurate indication of the steering behavior of vehicle 10 over the entire range of the dynamic state of vehicle 10, including both steady state and transient steering or cornering conditions and linear and non-linear regions of tire performance behavior.

The step of calculating 230 the estimated steering behavior indicator 155 for a particular control loop ($k_0$) generally comprises updating estimated steering behavior indicator 155 of a prior control loop ($\hat{K}_\mu(k_{-1})$) using a dynamic state correction term ($C(k_0)$) that is a function of the dynamic state of the vehicle. It is preferred that updating of estimated steering behavior indicator 155 of a prior control loop ($\hat{K}_\mu(k_{-1})$) using a dynamic state correction term ($C(k_0)$) be performed according to the relationship comprising:

$$\hat{K}_\mu(k_0) = \hat{K}_\mu(k_{-1}) + C(k_0) \quad (2)$$

It is also preferred that the dynamic state correction term ($C(k_0)$) comprise an estimation error ($\epsilon(k_0)$) related to the calculation of the estimated steering behavior indicator for the control loop. It is further preferred that the estimation error comprise a least squares estimation error value. It is further preferred that the estimation error is factored by an estimation error correction factor ($F_{\epsilon(k_0)}$) that is adapted to correct the estimation error as a function of the vehicle dynamic state. The dynamic state correction term may be expressed as:

$$C(k_0) = F_{\epsilon(k_0)}(\epsilon(k_0)). \quad (3)$$

The dynamic state correction term is also a function of a weighting factor ($\alpha(k)$) that varies as a function of the dynamic state of vehicle 10 and consequently, dynamic state inputs 145. The weighting factor may be determined as a function of one or more dynamic state inputs 145, or quantities which may be determined from them. It is preferred that the value of the weighting factor be determined as a function of the vehicle lateral velocity rate ($\dot{V}_{yd}$) and steering angle rate (SAR) associated with the control loop (k) for which estimated steering behavior indicator 155 is to be calculated and the covariance associated with the calculation of estimated steering behavior indicator 155 of a prior control loop ($k_{-1}$), which is preferably the control loop immediately preceding the particular control loop ($k_0$) of interest.

Method 200 also comprises a step of storing 240 information related to dynamic state inputs 145 and the calculation of estimated steering behavior indicator 155 for a portion of the plurality of control loops. This step comprises storing certain of the values associated with the calculation of estimated steering behavior indicator 155 from the control loop of interest or prior control loops for use in the calculation of estimated steering behavior indicators 155 during subsequent control loops. The particular values to be stored and the duration for which they are stored will be a function of the step of calculating 230 estimated steering behavior indicator 155 and the specific form of the calculation algorithms and vehicle dynamics equations utilized for the calculation. The step of storing 240 information and the duration of storage of this information may be further understood from the embodiment of method 200 and specific examples described herein for the calculation.

Once the steering behavior indicator has been estimated, method 200 also comprises the step of controlling 250 the vehicle using the controller 110 in response to the value of estimated steering behavior indicator 155. Controlling 250 may be performed by executing control using any of the vehicle control systems 120, subsystems or components that may be controlled by controller 110 to alter the dynamic state of vehicle 10 and dynamic state inputs 145 and the value of steering behavior indicator 155 either during a given control loop, or during a subsequent control loop ($k_{+1 \ldots +n}$) or control loops, as described herein.

Figure 6:
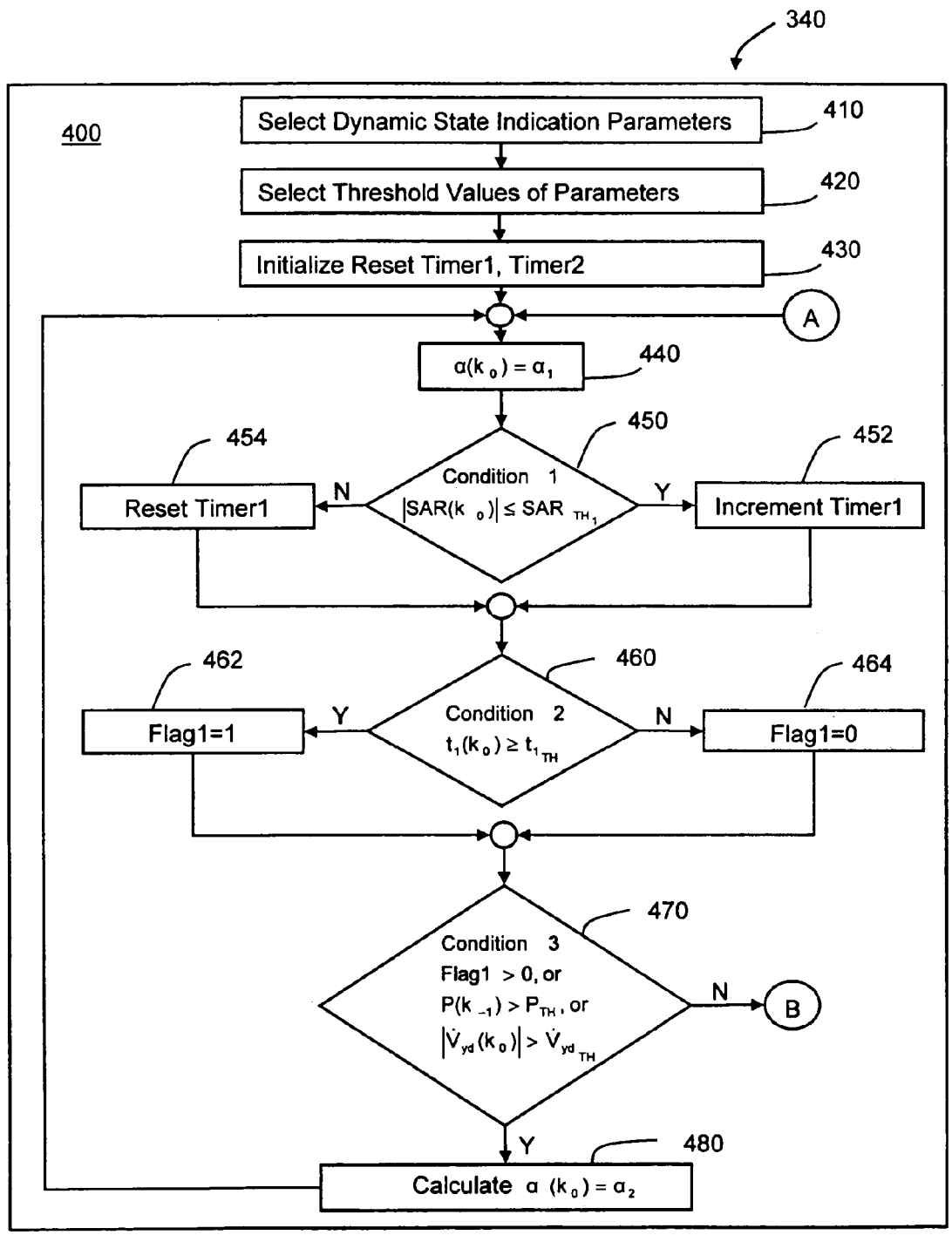
FIG. 6 is a flowchart of the step of determining the weighting factor.
Figure 7:
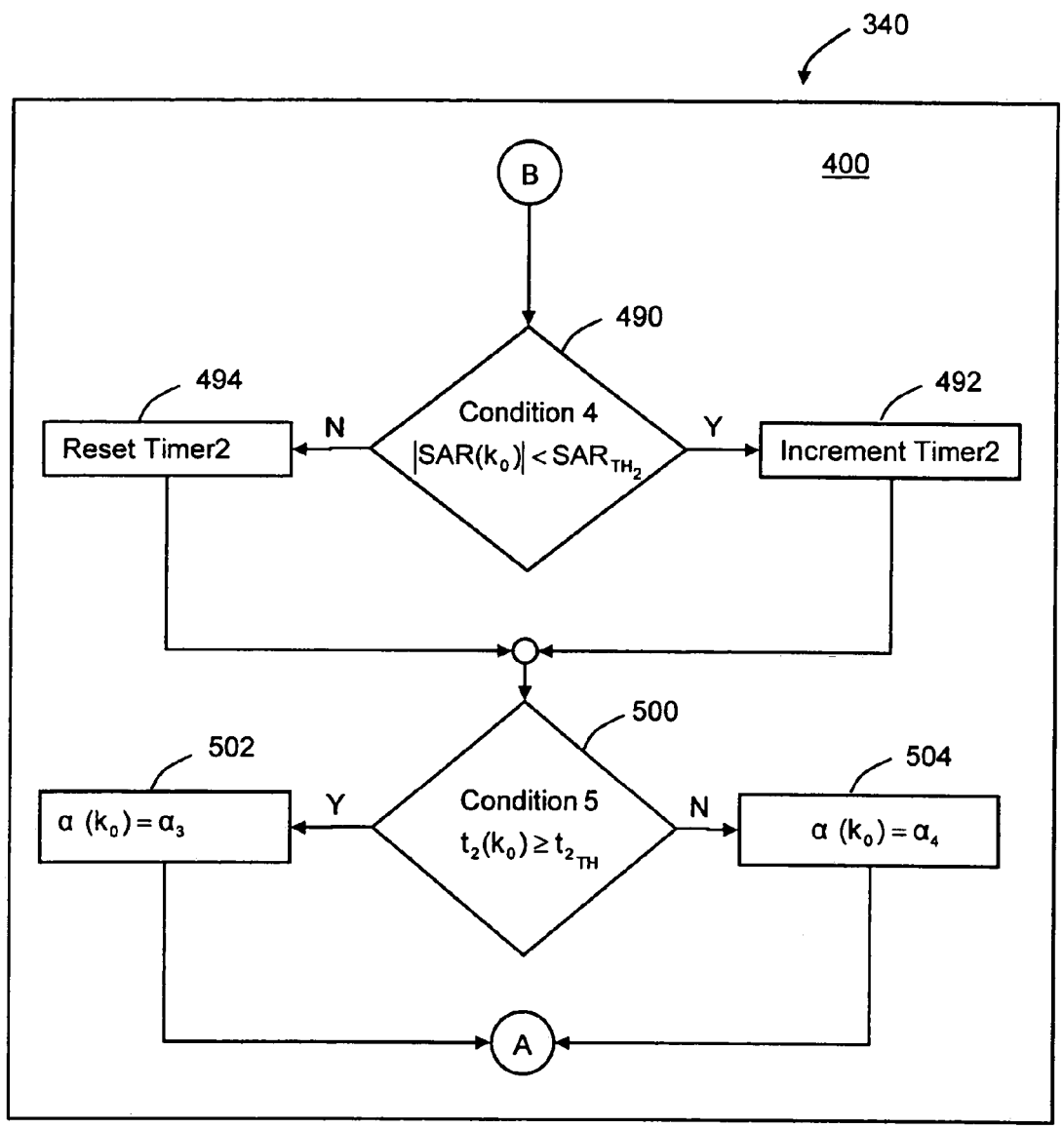
FIG. 7 is a continuation of the flowchart of FIG. 6.

The following description and FIGS. 5-7 illustrate one example or embodiment of the method 200 of the present invention and the step of calculating 230 the understeer-oversteer behavior indicator, including the control formulas, algorithms and other relationship associated with this step. The dynamic state inputs 145 utilized in this embodiment for a given control loop ($k_0$) comprise vehicle speed 62 ($V_x(k_0)$), yaw rate 78 ($\dot{\psi}(k_0)$), steering angle 68 ($\delta_f(k_0)$) and a lateral acceleration 80 ($\alpha_y(k_0)$). The nomenclature used herein for calculating the understeer-oversteer behavior indicator using these dynamic state inputs is as follows, wherein references made to a "register" are intended to comprise a memory register, or plurality of registers, or other information storage means or device that is suitable for the step of storing 240 information associated with the quantity being referenced:

"$|\dot{V}_{yd}(k)|$" is a register containing the absolute values of the vehicle lateral velocity rate (m/sec²) for a plurality of control loops (k);

"$V_x(k)$" is a register containing the vehicle speed or velocity (kph) for a plurality of control loops (k);

"$\alpha_y(k)$" is a register containing the lateral acceleration (g) of the vehicle for a plurality of control loops (k);

"$V_{x_{TH}}$" is a register containing a vehicle velocity threshold (m/sec), for example, 2.77(m/sec);

"$\dot{\psi}(k)$" is a register containing the actual vehicle yaw rate (deg/sec) for a plurality of control loops (k);

"$\delta_f(k)$" is a register containing the actual steering angle based on driver input (deg) comprising a steering wheel angle where the steering input is provided by a steering wheel for a plurality of control loops (k);

"L" is a register containing the vehicle wheel base (m);

"$SA_{TH}$" a register containing a first steering angle threshold (deg), for example, 10 deg.;

"$|SAR(k)|$" is a register containing the absolute value of the derivative of vehicle steering wheel angle (deg/sec) for a plurality of control loops (k);

"$SAR_{TH_1}$" is a register containing a first threshold related to the derivative of the vehicle steering angle (deg/sec), for example, 10 deg/sec;

"$SAR_{TH_2}$" is a register containing a second threshold related to the derivative of the vehicle steering wheel angle (deg/sec), for example, 40 deg/sec;

"$\dot{V}_{yd_{TH}}$" is a register containing a lateral velocity threshold (m/sec²), for example, 2.4 m/sec²;

"$T(k_0)$" is a register containing control sample interval of the control loop (ms), for example, 10 ms;

"$t_1(k_0)$" is a register containing an accumulated time from a first timer ("Timer1") that is adapted to measure the period of time during which Condition 2 (see FIG. 6) is satisfied;

"$t_{1_{TH}}$" is a register containing a threshold time for the first timer (ms), for example, 500 ms;

"Flag1" is a register containing a first flag based on value of $t_1(k_0)$;

"$t_2(k_0)$"=is a register containing an accumulated time from a second timer ("Timer 2")that is adapted to measure the period of time during which Condition 4 (see FIG. 7) is satisfied;

"$t_{2_{TH}}$" is a register containing a threshold time for the second timer, for example, 500 ms;

"$P_{TH}$" is a register containing a covariance threshold, for example, $10^{-3}$;

"$\alpha_1$" is a register containing a first value of the weighting factor, for example, 1.0;

"$\alpha_2$" is a register containing a second value of the weighting factor, preferably a value calculated in accordance with method 400 described herein;

"$\alpha_3$" is a register containing a third value of the weighting factor, for example, 0.998;

"$\alpha_4$" is a register containing a fourth value of the weighting factor, for example, 0.995;

"$\alpha$" is a vehicle weighting factor, which is preferably a constant, and which is preferably determined empirically for a particular vehicle, for example, 0.999; and "| |" designates an "absolute value" operator.

Referring now to FIG. 5, an overview of the preferred embodiment of a method 300 for the step of calculating 230 estimated steering behavior indicator 155 for a control loop ($k_0$) is described in the following series of steps.

Method 300 comprises a first step of computing 310 the lateral velocity rate ($\dot{V}_{yd}(k_0)$) according to the relationship comprising:

$$\dot{V}_{yd}(k_0) = (\dot{\psi}(k_0)/57.3)(Vx(k_0)/3.6) - a_y(k_0)(9.81). \quad (4)$$

Method 300 also comprises a second step of computing 320 an estimated derivative of the steering wheel angle or a steering wheel angle rate ($SAR_{est}(k_0)$) (deg/sec) for the control loop ($k_0$) according to the relationship comprising:

$$SAR_{est}(k_0) = SAR_{est}(k_{-1}) + T_{k_0}(g_2)(\delta_f(k_0) - SA_{est}(k_0)); \quad (5)$$

where:

$$SA_{est}(k_0) = (1 - T(k_0)(g_1))(SA_{est}(k_{-1})) + T(k_0)(g_1)(\delta_f(k_0)) + T(k_0)(SAR_{est}(k_{-1})); \quad (6)$$

$$g_1 = 2(\zeta)(2\pi)(fn));$$

$$g_2 = (2\pi)(fn))^2;$$

and:

fn is a frequency coefficient, for example, 2 hz;
$\zeta$ is a damping coefficient, for example, 0.707;
$T(k_0)$ is a sampling time interval of the control loop ($k_0$), for example 10 ms;
$k_0$ is one of the plurality of control loops,
$k_{-1}$ is a first prior control loop, wherein $k_1$ precedes $k_0$,
$k_{-2}$ is a second prior control loop, wherein $k_2$ precedes $k_1$,
$\delta_f(k_0)$ is the steering wheel angle input for the control loop ($k_0$)
$SA_{est}(k_0)$ is a steering angle estimate for the control loop ($k_0$);
$SA_{est}(k_{-1})$ is a steering angle estimate for the control loop ($k_{-1}$); and $SAR_{est}(k_{-1})$ is the estimated derivative of the steering wheel angle for control loop ($k_{-1}$).

The general steering equation may then be rewritten in the following form:

$$K_\mu(k_0)V_x(k_0)a_y(k_0) = \delta_f(k_0)V_x(k_0) - L\dot{\psi}(k_0); \quad (7)$$

and the following variables may be computed:

$$\gamma(k_0) = \delta_f(k_0)V_x(k_0) - L\dot{\psi}(k_0); \quad (8)$$

$$\xi(k_0) = a_y(k_0)V_x(k_0). \quad (9)$$

Therefore, the general steering equation can be rewritten in the following form:

$$\gamma(k_0) = \xi(k_0)\hat{K}_\mu(k_0). \quad (10)$$

Once these variables have been computed, method 300 comprises computing 330 the estimation error related to the calculation of the estimated steering behavior indicator ($k_0$). The estimation is preferably an error calculated using a least squares error method according to the relationship comprising:

$$\epsilon(k_0) = \gamma(k_0) - \xi(k_{-1})\hat{K}_\mu(k_{-1}); \quad (11)$$

where $\hat{K}_\mu(k_{-1})$ is the estimated steering behavior indicator of understeer or oversteer for a prior control loop ($k_{-1}$), which is preferably the control loop immediately preceding the control loop ($k_0$).

Once the estimation error has been computed, method 300 comprises a fourth step of determining 340 a weighting factor ($\alpha(k)$) that is indicative of and a function of the dynamic state of vehicle 10 and the dynamic state indication parameters. A method of 400 of determining 340 the weighting factor is described in greater detail below.

Once the weighting factor has been computed, method 300 comprises a fifth step of calculating 350 the estimated understeer-oversteer behavior indicator 155 for a control loop ($k_0$) by updating a prior value of indicator ($K_\mu(k_{-1})$ 155 from a prior control loop ($k_{-1}$) according to the relationship comprising:

$$\hat{K}_\mu(k_0) = \hat{K}_\mu(k_{-1}) + F_{\epsilon(k_0)}\epsilon(k_0); \quad (12)$$

where the estimation error is also factored by an estimation error correction factor ($F_{\epsilon(k_0)}$) that is adapted to correct the estimation error as a function of the vehicle dynamic state, and is preferably calculated according to the relationship comprising:

$$F_{\epsilon(k_0)} = \frac{P(k_{-2})\xi(k_{-1})}{\alpha(k_{-1}) + \xi^2(k_{-1})P(k_{-2})}; \quad (13)$$

and:

$k_0$ is one of the plurality of control loops;
$k_{-1}$ is a first prior control loop, wherein $k_1$ precedes $k_0$;
$k_{-2}$ is a second prior control loop, wherein $k_2$ precedes $k_1$;
L comprises a wheelbase of the vehicle;
$P(k_{-1})$ is a covariance term calculated for the first prior control loop;
$P(k_{-2})$ is a covariance term calculated for the second prior control loop;
$\alpha(k_{-1})$ is a weighting factor determined for the first prior control loop;
$\alpha(k_{-2})$ is a weighting factor determined for the second prior control loop.

The covariance for the first prior control loop ($P(k_{-1})$) is preferably calculated according to the relationship comprising:

$$P(k_{-1}) = \frac{1}{\alpha(k_{-1})}\left[P(k_{-2}) - \frac{P^2(k_{-2})\xi^2(k_{-1})}{\alpha(k_{-1}) + \xi^2(k_{-1})P(k_{-2})}\right]; \quad (14)$$

and the covariance for the second prior control loop ($P(k_{-2})$) can be calculated using this relationship by making appropriate substitution.

The variable $\alpha(k)$ comprises the weighting factor used in the preceding expressions. Since an objective of this invention is to estimate the steering behavior indicator 155, or more specifically an understeer/neutral steer/oversteer behavior indicator for all dynamic states of vehicle 10, including steady state and transient steering conditions, as well as linear and non-linear tire behavior, the above estimator must be adapted to continuously track under all dynamic states of the vehicle. As may be seen, if the value of $\alpha$ is set to 1, the above algorithm provides extremely rapid initial convergence to the solution of the general steer equation that is needed when the vehicle is in the steady state steering condition. However, when the vehicle is in a transient steering condition, $\alpha=1$ is unsuitable for the transient condition since in this case the covariance $(P(k))$ rapidly converges to zero and the estimator switches off. However, if $\alpha$ is set to an appropriate value less than 1, and the vehicle encounters a transient steering condition, such that a sudden change in the understeer-oversteer behavior of vehicle 10 occurs, the square of the estimation error $(\epsilon(k)^2)$ increases, and $P(k)$ increases quickly. In this instance, estimated steering behavior indicator 155 may be calculated or determined and rapid adaptation and control of an appropriate control system 120 based on the value of estimated steering behavior indicator 155 can occur. After adaptation and control through an appropriate vehicle control, the square of the error $(\epsilon(k)^2)$ decreases and the value of $\alpha$ preferably should return to a value close to 1.

FIGS. 6 and 7 illustrate a method 400 for the step of determining 340 the weighting factor so as to accommodate the entire dynamic state of vehicle 10, including transient and steady state steering conditions, as well as linear and non-linear tire behavior.

The value of $\alpha(k)$ is preferably calculated using a method 400 comprising the following steps, wherein weighting factor $\alpha(k_0)$ varies as a function of the vehicle dynamic state, and further as a function of a predetermined dynamic state indication parameter.

Method 400 comprises a first step of selecting 410 a predetermined dynamic state indication parameter. The predetermined dynamic state indication parameter preferably comprises a plurality of dynamic state indication parameters comprising lateral velocity rate ($\dot{V}_{yd}(k_0)$), steering angle rate ($SAR(k_0)$) and a prior loop covariance $P(k_{-1})$ related to the calculation of the prior loop estimated steering behavior indicator. These are the parameters which are indicative of the dynamic state of vehicle 10 and which are used as a basis for determining the value of the weighting factor and thus controlling the value of the estimator. The weighting factor is determined through the use of conditional tests associated with these parameters.

Method 400 comprises a second step of selecting 420 a threshold value of the dynamic state indication parameter or parameters. Step 420 preferably comprises selecting a covariance threshold ($P_{TH}$), a lateral velocity rate threshold ($\dot{V}_{yd_{TH}}$), a first steering angle rate threshold ($SAR_{TH_1}$), a second steering angle rate threshold ($SAR_{TH_2}$), a first timer count threshold ($t_{1_{TH}}$) and a second timer count threshold ($t_{2_{TH}}$).

Method 400 comprises a third step of initializing 430 a first timer to a first timer initial value and a second timer to a second timer initial value. First timer and second timer are each adapted to measure time intervals within a particular control loop (k). It is preferred that the initial value for both the first timer and second timer be zero.

Method 400 comprises a fourth step of setting 440 the value of the weighting factor to a first value ($\alpha_1(k)$). It is preferred that $\alpha_1(k)=1.0$, such that the algorithm for calculating the estimated steering behavior indicator rapidly converges to a steady state steering condition solution as the estimation error correction factor goes to zero.

Method 400 comprises a fifth step of determining 450 a first condition (Condition 1), wherein the first condition is satisfied if $|SAR(k_0)| \leq SAR_{TH_1}$. If the first condition is satisfied, method 400 proceeds by incrementing 452 the first timer (Timer1) while the first condition is satisfied to determine a first timer count ($t_1(k_0)$), and if the first condition is or becomes not satisfied, returning 454 to step 430 of initializing the first timer and the second timer. While it is possible and acceptable to the method of the invention to directly obtain a derivative ($SAR(k_0)$) of the steering angle ($SA(k_0)$), such as by appropriate analysis and processing of the steering angle signal, it is preferred to calculate an estimated steering angle rate ($SAR_{est}(k_0)$) from the steering angle information ($SA(k)$). This is preferred because most of the commercially available steering angle sensors do not also provide the steering angle rate, thus it is frequently not readily available. A preferred method of determining $SAR_{est}(k_0)$ is shown herein in conjunction with Equation 5.

Method 400 comprises a sixth step of determining a second condition (Condition 2) while the first condition is satisfied, wherein the second condition is satisfied if $$t_1(k_0) \geq t_{1_{TH}}.$$

This determination can be performed by setting 462 a first value of a first flag (Flag1) of Condition 2 is satisfied, and by setting 464 a second value of a first flag if Condition 2 is not satisfied.

Method 400 comprises a seventh step of determining 470 a third condition (Condition 3), wherein the third condition is satisfied if the second condition is satisfied (i.e.

$$\text{(i.e. } (t_1(k_0) \geq t_{1_{TH}})),$$

or $P(k_{-1}) > P_{TH}$, or $$|\dot{V}_{yd}(k_0)| > \dot{V}_{yd_{TH}}.$$

If the third condition is satisfied, method 400 proceeds with an eighth step comprising calculating 480 a second value for the weighting factor ($\alpha_2(k_0)$) as a function of the estimation error, the lateral acceleration and the vehicle speed. The step of calculating a second value for the weighting factor ($\alpha_2(k_0)$) is preferably performed according to the relationship comprising:

$$\alpha_2(k_0) = 1 - \alpha'\left[\frac{\varepsilon^2(k_0)}{1+\xi^2(k_{-1})P(k_{-2})}\right]; \quad (15)$$

where:

$\alpha'$ is a vehicle weighting factor.

A typical value of the weighting factor is about 0.99. The vehicle weighting factor may be determined or adjusted empirically by known methods, for example, by comparison of the value of the estimated steering behavior indicator under conditions where the actual steering behavior indicator may be calculated.

If the third condition is not satisfied, method 400 proceeds with an ninth step which comprises determining, 490 a fourth condition (Condition 4), wherein if $|SAR_{est}(k_0)| < SAR_{TH_2}$, the fourth condition is satisfied. If the fourth condition is satisfied, method 400 proceeds by incrementing 492 the first timer (Timer1) while the fourth condition is satisfied to determine a second timer count ($t_2(k_0)$), and if the fourth condition is or becomes not satisfied, returning 494 to step 430 of initializing the second timer.

If the fourth condition is satisfied, the method proceeds with a ninth step which comprises incrementing the second timer while the fourth condition is satisfied to determine a second timer count ($t_2(k_0)$). If the fourth condition is or becomes not satisfied, the method proceeds with a tenth step wherein the second timer is reset to the second timer initial value.

If the fourth condition is satisfied, following the incrementing of the second timer, the proceeds with a step which comprises determining 500 a fifth condition (Condition 5) while the fourth condition is satisfied, wherein the fifth condition is satisfied if $(t_2(k_0)) \geq t_{2_{TH}}$. If the fifth condition is satisfied, method 400 proceeds with a step of setting 502 the value of the weighting factor to a third value ($\alpha(k_0)=\alpha_3$), where $\alpha_3 < \alpha_1$. If the fifth condition is not satisfied, method 400 proceeds with a step which comprises setting 504 the value of the weighting factor to a fourth value ($\alpha(k_0)=\alpha_4$). It is frequently the case that $\alpha_4 < \alpha_3$, but this relationship is not essential to the invention. These values may be determined empirically and are preferably selected so as to prevent the steering behavior estimator from switching off under the condition associated with their selection.

Referring to FIGS. 6 and 7, for the control loop $k_0$ these conditional tests may be carried out as a series of conditional logic statements or other statements in a computer control algorithm. The computer control algorithm may be executed within the controller.

Because the method 200 of the invention utilizes various data from prior control loops to calculate estimated steering behavior indicator 155, it will be appreciated that during the first several control loops during which method 200 is employed, that it may be desirable to provide initial values for this data to initiate method 200 using known techniques for accomplishing such initialization.

Further scope of applicability of the present invention will become apparent from the drawings and this detailed description, as well as the following claims. However, it should be understood that the detailed description and specific examples, while indicating preferred embodiments of the invention, are given by way of illustration only, since various changes and modifications within the spirit and scope of the invention will become apparent to those skilled in the art.

The invention claimed is:

1. A method of controlling a vehicle, comprising:
    providing a plurality of dynamic state inputs to a controller in a vehicle that is adapted to execute a plurality of control loops, each dynamic state input indicative of a dynamic state of the vehicle;
    calculating an estimated oversteer-understeer coefficient corresponding to a general steering equation using the controller and the dynamic state inputs during each of the plurality of control loops; wherein the estimated oversteer-understeer coefficient is adapted to provide an indication of the oversteer-understeer behavior of the vehicle during the dynamic state;
    storing information related to the dynamic state inputs and the calculation of the estimated oversteer-understeer coefficient for a portion of the plurality of control loops; and
    controlling the vehicle in response to the estimated oversteer-understeer coefficient.

2. The method of claim 1, wherein said calculating an estimated steering coefficient for a control loop comprises updating an estimated steering coefficient of a prior control loop using a dynamic state correction term that is a function of the dynamic state of the vehicle.

3. The method of claim 2, wherein the dynamic state correction term is a function of a weighting factor that varies as a function of the vehicle dynamic state.

4. The method of claim 3, further comprising:
    determining the weighting factor as a function of a predetermined dynamic state indication parameter.

5. The method of claim 4, wherein the predetermined dynamic state indication parameter comprises a lateral velocity rate, a steering angle rate and a prior control loop covariance related to the calculation of the prior control loop estimated oversteer-understeer coefficient.

6. The method of claim 5, wherein said controlling the vehicle comprises providing an output from the controller to a yaw control system.

7. The method of claim 6, wherein the yaw control system is selected from a group consisting of a propulsion subsystem, a steering subsystem, a braking subsystem, and a suspension subsystem.

8. A method of controlling a vehicle, comprising:
    sensing a plurality of dynamic state parameters of a vehicle; providing a plurality of dynamic state inputs which are representative of the dynamic state parameters to a controller in the vehicle that is adapted to execute a plurality of control loops, each dynamic state input indicative of a dynamic state of the vehicle;
    calculating an estimated oversteer-understeer coefficient corresponding to a general steering equation ($\hat{K}_\mu$) using the controller and the dynamic state inputs during each of the plurality of control loops; wherein the estimated oversteer-understeer coefficient is adapted to provide an indication of the oversteer-understeer behavior of the vehicle during the dynamic state;
    storing information related to the dynamic state inputs and the calculation of the estimated oversteer-understeer coefficient for a portion of the plurality of control loops; and
    controlling the vehicle using the controller in response to the estimated steering coefficient.

9. The method of claim 8, wherein calculating said estimated steering coefficient for a control loop ($k_0$) comprises updating an estimated oversteer-understeer coefficient of a prior control loop ($\hat{K}\mu(k_{-1})$) using a dynamic state correction term ($C(k_0)$) that is a function of the dynamic state of the vehicle according to the relationship:

$$\hat{K}_\mu(k_0) = \hat{K}\mu(k_{-1}) + C(k_0).$$

10. The method of claim 9, wherein the dynamic state correction term comprises an estimation error related to the calculation of the estimated oversteer-understeer coefficient for the control loop.

11. The method of claim 10, wherein the estimation error is factored by an estimation error correction factor that is adapted to correct the estimation error as a function of the vehicle dynamic state.

12. The method of claim 11, wherein the estimation error correction factor is a function of a weighting factor that varies as a function of the vehicle dynamic state.

13. The method of claim 12, wherein the dynamic state inputs comprise a vehicle speed, a yaw rate, a steering angle and a lateral acceleration.

14. The method of claim 13, wherein calculating the estimated oversteer-understeer coefficient $\hat{K}_\mu(k_0)$ is performed according to the relationship comprising:

$$\hat{K}_\mu(k_0) = \hat{K}_\mu(k_{-1}) + F_{\epsilon(k_0)}\epsilon(k_0)$$

wherein:

$$\epsilon(k_0) = \gamma(k_0) - \xi(k_{-1})\hat{K}_\mu(k_{-1}),$$

$$\gamma(k_0) = \delta_f(k_0)V_x(k_0) - L\dot{\psi}(k_0),$$

$$\xi(k_0) = a_y(k_0)V_x(k_0),$$

$$P(k_{-1}) = \frac{1}{\alpha(k_{-1})}\left[P(k_{-2}) - \frac{P^2(k_{-2})\xi^2(k_{-1})}{\alpha(k_{-1}) + \xi^2(k_{-1})P(k_{-2})}\right]$$

$$F_{\epsilon(k_0)} = \frac{P(k_{-2})\xi(k_{-1})}{\alpha(k_{-1}) + \xi^2(k_{-1})P(k_{-2})},$$

and:
 $k_0$ is one of the plurality of control Loops,
 $k_1$ is a first prior control loop, wherein $k_1$ precedes $k_0$,
 $k_2$ is a second prior control loop, wherein $k_2$ precedes $k_1$,
 L comprises a wheelbase of the vehicle,
 $P(k_1)$ is a covariance term calculated for the first prior control loop,
 $P(k_2)$ is a covariance term calculated for the second prior control loop,
 $\alpha(k_1)$ is a weighting factor determined for the first prior control loop,
 $\alpha(k_2)$ is a weighting factor determined for the second prior control loop.

15. The method of claim 14, further comprising determining the weighting factors as a function of a predetermined dynamic state indication parameter.

16. The method of claim 15, wherein the predetermined dynamic state indication parameter comprises a lateral velocity rate, a steering angle rate and a prior control loop covariance related to the calculation of the prior control loop estimated oversteer-understeer coefficient.

17. The method of claim 16, further comprising: determining the lateral velocity rate during the control loop; determining the steering angle rate ($SAR(k_0)$) during the control loop; and determining the prior loop covariance.

18. The method of claim 17, wherein determining a steering angle rate comprises calculating an estimated steering angle rate ($SAR_{est}(k_0)$).

19. The method of claim 18, wherein calculating the estimated steering angle rate is performed according to the relationship comprising:

$$SAR_{est}(k_0) = SAR_{est}(k_{-1}) + T_{k_0}(g_2)(\delta_f(k_0) - SA_{est}(k_0))$$

where:

$$SA_{est}(k_0) = (1 - T_k(g_1))(SA_{est}(k_{-1})) + T_{k_0}(g_1)(\delta_f(k_0)) + T_k(SAR_{est}(k_{-1})),$$

$$g_1 = 2(\zeta)(2\pi(fn)),$$

$$g_2 = (2\pi(fn))^2$$

and:
 fn is a frequency coefficient,
 $\zeta$ is a damping coefficient,
 $T_{k_0}$ is a sampling time interval of the control loop ($k_0$),
 $SA_{est}(k_0)$ is a steering angle estimate for the control loop ($k_0$),
 $SA_{est}(k_{-1})$ is a steering angle estimate for the control loop ($k_{-1}$),
 $SAR_{est}(k_{-1})$ is a steering angle rate estimate for a control loop ($k_{-1}$).

20. The method of claim 17, wherein a weighting factor $\alpha(k_0)$ for the control loop $k_0$ has a value which is determined by:
 selecting a covariance threshold ($P_{TH}$), a lateral velocity rate threshold $$(\dot{V}_{ydTH}),$$

a first steering angle rate threshold $$(SAR_{TH_1}),$$

a second steering angle rate threshold $$(SAR_{TH_2}),$$

a first timer count threshold $$(t_{1_{TH}})$$

and a second timer count threshold $$(t_{2_{TH}});$$

initializing a first timer to a first timer initial value and a second timer to a second timer initial value,
setting the value of the weighting factor $\alpha(k_0)$ to a first value $\alpha_1(k_0)$;
determining a first condition, wherein the first condition is satisfied if $$|SAR(k_0)| \leq SAR_{TH_1},$$

and if the first condition is satisfied, incrementing the first timer while the first condition is satisfied to determine a first timer count ($t_1(k_0)$), and if the first condition is or becomes not satisfied, returning to initializing the first timer and the second timer;

determining a second condition while the first condition is satisfied, wherein the second condition is satisfied if $$t_1(k_0) \geq t_{1_{TH}};$$

determining a third condition, wherein the third condition is satisfied if the second condition is satisfied, or $P(k_{-1}) > P_{TH}$, or $$|\dot{V}_{yd}(k_0)| > \dot{V}_{y_{dTH}};$$

if the third condition is satisfied, calculating a second value $\alpha_2(k_0)$ for the weighting factor $\alpha(k_0)$ as a function of the estimation error, the lateral acceleration and the vehicle speed;

if the third condition is not satisfied, determining a fourth condition, wherein if $|SAR_{est}(k_0)| < SAR_{TH_2}$, the fourth condition is satisfied, and if the fourth condition is satisfied, incrementing the second timer while the fourth condition is satisfied to determine a second timer count ($t_2(k_0)$), and if the fourth condition is or becomes not satisfied, the second timer is reset to the second timer initial value;

if the fourth condition is satisfied, determining a fifth condition while the fourth condition is satisfied, wherein the fifth condition is satisfied if $(t_2(k_0) \geq t_{2_{TH}}$, and wherein if the fifth condition is satisfied, setting the value of the weighting factor $\alpha(k_0)$ to a third value $\alpha_3(k_0)$, where $\alpha_3(k_0)(\alpha_1(k_0)$, and wherein if the fifth condition is not satisfied, setting the value of the weighting factor $\alpha(k_0)$ to a fourth value $\alpha_4(k_0)$.

21. The method of claim 20, wherein calculating a second value $\alpha_2(k_0)$ for the weighting factor $\alpha(k_0)$ is performed according to the relationship comprising:

$$\alpha_2(k_0) = 1 - \alpha' \left[ \frac{\varepsilon^2(k_0)}{1 + \xi^2(k_{-1})P(k_{-2})} \right],$$

and: $\alpha'$ is a vehicle weighting factor.

22. The method of claim 21, wherein $\alpha_1(k_0)=1$.

23. The method of claim 20, wherein said step of controlling the vehicle comprises providing an output from the controller to a yaw control system.

24. The method of claim 23, wherein the yaw control system is selected from a group consisting of a propulsion subsystem, a steering subsystem, a braking subsystem, and a suspension subsystem.

25. An integrated chassis control system for a vehicle, comprising:

a controller which is adapted to execute a plurality of control loops, and receive a plurality of dynamic state inputs that are indicative of a dynamic state of a vehicle during its operation and determine an oversteer-understeer coefficient corresponding to a general steering equation from the dynamic state inputs that is adapted to provide an indication of the oversteer-understeer behavior of the vehicle during the dynamic state of the vehicle; and a control system that is adapted to communicate with said controller and provide control of the dynamic state of the vehicle in response to the oversteer-understeer coefficient.

26. The system of claim 25, wherein the dynamic state inputs comprise a speed input, a yaw rate input, a steering angle input and a lateral acceleration input.

27. The system of claim 26, wherein the estimated steering be coefficient for a control loop is determined by updating an estimated oversteer-understeer coefficient of a prior control loop using a dynamic state correction term that is a function of the dynamic state of the vehicle.

28. The system of claim 27, wherein the dynamic state correction term is a function of a weighting factor that varies as a function of a dynamic state indication parameter.

29. The system of claim 28, wherein the predetermined dynamic state indication parameter comprises a lateral velocity rate, a steering angle rate and a prior control loop covariance related to the calculation of the prior control loop estimated oversteer-understeer coefficient.

30. The system of claim 29, wherein the control system comprises a yaw control system.

31. The method of claim 30, wherein the yaw control system is selected from a group consisting of a propulsion subsystem, a steering subsystem, a braking subsystem, and a suspension subsystem.

\* \* \* \* \*